(12) United States Patent
Yang

(10) Patent No.: US 8,120,747 B2
(45) Date of Patent: Feb. 21, 2012

(54) METHOD FOR INTEGRATING LCD MONITOR CIRCUITRY

(75) Inventor: Steve Wiyi Yang, Chupei (TW)

(73) Assignee: MSTAR Semiconductor, Inc., Hsinchu County (TW)

( * ) Notice: Subject to any disclaimer, the term of this patent is extended or adjusted under 35 U.S.C. 154(b) by 344 days.

(21) Appl. No.: 11/889,876

(22) Filed: Aug. 17, 2007

(65) Prior Publication Data

US 2008/0291387 A1 Nov. 27, 2008

Related U.S. Application Data

(62) Division of application No. 11/092,879, filed on Mar. 30, 2005, now Pat. No. 7,768,791.

(30) Foreign Application Priority Data

Dec. 10, 2004 (TW) .............................. 93138232 A

(51) Int. Cl.
*G02F 1/1345* (2006.01)
*G02F 1/13* (2006.01)
*H05K 7/10* (2006.01)

(52) U.S. Cl. ........ 349/187; 349/151; 361/760; 361/764; 361/767

(58) Field of Classification Search .................. 349/149, 349/151, 187; 361/767, 760, 764
See application file for complete search history.

(56) References Cited

U.S. PATENT DOCUMENTS

| | | | | |
|---|---|---|---|---|
| 4,699,470 A | * | 10/1987 | McLaughlin et al. | 349/152 |
| 5,510,915 A | * | 4/1996 | Ge et al. | 349/42 |
| 2003/0058083 A1 | * | 3/2003 | Birchfield | 340/5.22 |
| 2004/0119925 A1 | * | 6/2004 | Moon | 349/139 |
| 2005/0030726 A1 | * | 2/2005 | Park | 361/792 |

* cited by examiner

*Primary Examiner* — Nathanael R Briggs
(74) *Attorney, Agent, or Firm* — WPAT, PC; Justin King

(57) ABSTRACT

A method and a device for integrating LCD monitor circuitry using a single-layered printed circuit board so as to improve the productivity and reduce the cost of manufacturing LCD monitors.

2 Claims, 4 Drawing Sheets

METHOD FOR INTEGRATING LCD MONITOR CIRCUITRY

RELATED APPLICATIONS

This application is a Division of currently application U.S. Ser. No. 11/092,879, entitled "METHOD AND DEVICE FOR INTEGRATING LCD MONITOR CIRCUITRY" and filed on Mar. 30, 2005 now U.S. Pat. No. 7,768,791.

1. FIELD OF THE INVENTION

The present invention generally relates to a method and a device for integrating liquid crystal display (LCD) monitor circuitry and, more particularly, to a method and a device using a single-layered printed circuit board (PCB) for LCD monitor circuitry integration.

2. BACKGROUND OF THE INVENTION

With the mass production of LCD monitors, unceasing demand in improved quality and reduced manufacturing cost has become stronger when practicability as well as competitiveness of LCD monitor industry grows higher.

It is usually a primary method for increasing productivity and reducing cost to integrate components forming products. For LCD monitors, however, it is only possible to integrate power-related circuitry and high-voltage alternate-current (AC) driving circuitry for the back-light module on a first PCB, referred to as a power circuit board, and integrate control circuitry on a second PCB, referred to as an analog-to-digital conversion board, a control circuit board or an image processing board. There exist some problems in integrating these two PCB's for reducing cost.

To date, the currently used circuit boards for power are mostly low-cost single-layered PCB's, while the control circuit boards are mostly two-layered PCB's. It may increase the PCB size and manufacturing complexity if single-layered PCB's are used for the control circuit boards. For example, control chips with high pin-count SMD's (surface mounted devices) are directly soldered onto the copper foil of single-layered PCB's, which may cause problems when dual in-line package (DIP) type devices are undergone soldering process. Therefore, it results in lowered yield and thus higher cost. On the other hand, single-layered PCB's exhibit poor immunity to noise. Electronic devices using such PCB's may fail to meet the requirement of safety regulations for electromagnetic radiation.

Therefore, there is need in providing a method and a device for integrating LCD monitor circuitry using a single-layered PCB for LCD monitor circuitry integration so as to solve the above problems as well as reduce the cost.

SUMMARY OF THE INVENTION

It is the primary object of the present invention to integrate the power PCB and the power circuit board and the control circuit board for LCD monitor products.

In order to achieve the foregoing object, the present invention provides a method for integrating LCD monitor circuitry, characterized in that conventional SMD-type IC's are packaged as DIP-type IC's. The DIP-type IC's have pins penetrating the printed circuit board and thus being soldered thereon. However, control IC's for LCD monitor products are mostly high pin-count devices, and therefore DIP-type package is not applicable because of enlarged size and increased cost. In the present invention, the number of pin-count of the DIP-type control IC is lowered and an anti-noise design is provided. Otherwise, a DIP socket is used as to install the non-DIP IC on a single-layered PCB.

According to the present invention, the method for integrating LCD monitor circuitry is characterized in that a low pin-count DIP-type control chip is installed on a single-layered PCB as the control circuit board. Therefore, the original power circuit board design for single-layered PCB can be used with the above-modified control circuit. As a result, the LCD monitor circuitry including the power circuit, the back-light driving circuit and the audio/video control circuit can be integrated on a low-cost single-layered PCB. It is noted that the high-noise power circuit must be kept distant from analog inputs of the control circuit so as to prevent noise interference and resulting image distortion.

Similarly, in order to achieve the foregoing object, the present invention provides a device for integrating LCD monitor circuitry, comprising: a power converting circuit, providing power required by said LCD monitor circuitry; a back-light driving circuit, providing a driving signal required by a LCD back-light module; and an image processing circuit; wherein said power converting circuit, said back-light driving circuit and said image processing circuit are integrated on a single-layered printed circuit board (PCB).

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms.

BRIEF DESCRIPTION OF THE DRAWINGS

The objects, spirits and advantages of the preferred embodiment of the present invention will be readily understood by the accompanying drawings and detailed descriptions.

DETAILED DESCRIPTION OF THE INVENTION

The present invention providing a method and a device for integrating LCD monitor circuitry can be exemplified by the preferred embodiments as described hereinafter.

Figure 1:
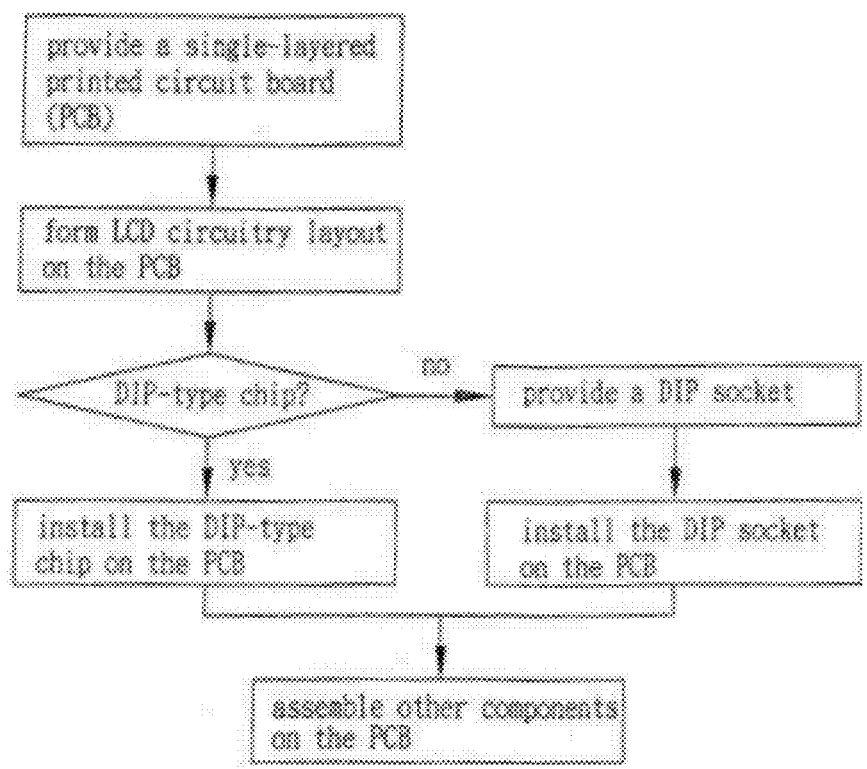
FIG. 1 is a flow-chart showing steps in the method for integrating LCD monitor circuitry according to the preferred embodiment of the present invention.

Please refer to FIG. 1, which is a flow-chart showing steps in the method for integrating LCD monitor circuitry according to the preferred embodiment of the present invention. First, a single-layered PCB is provided such that a circuit layout of LCD monitor circuitry can be formed on the single-layered PCB. A DIP-type control chip is then installed on the single-layered PCB; otherwise, a DIP socket is needed as to install a non-DIP chip on the single-layered PCB. The LCD monitor circuitry includes the power converting circuit, the back-light driving circuit and the image processing circuit.

Furthermore, an audio processing circuit can also be integrated in the LCD monitor circuitry on the single-layered PCB. It is noted that the high-noise power circuit must be kept distant from analog signal inputs of the image processing circuit so as to prevent image distortion.

Figure 2:
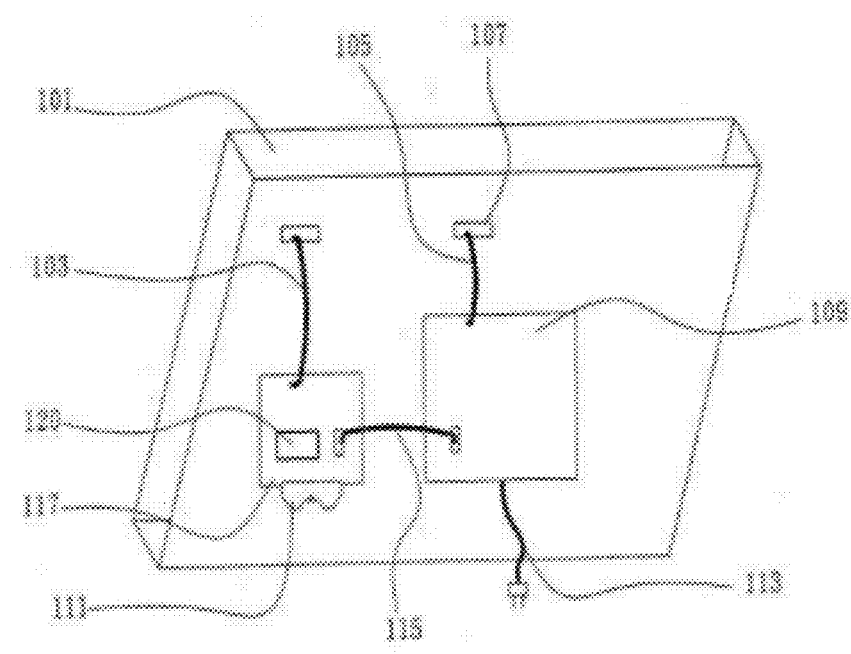
FIG. 2 is a schematic diagram showing conventional LCD monitor circuitry in the prior art.

Please further refer to FIG. 2, which is a schematic diagram showing LCD monitor circuitry according to the prior art. In FIG. 2, the image processing circuit is installed on a double-layered PCB, referred to as the control circuit board 117, comprising an image control chip 120. Generally, the image control chip 120 has a high pin-count SMD-type package and cannot be installed on a single-layered PCB. Moreover, low yield results from soldering processing for mass production because of the high pin intensity. In order to electronically connect the control circuit board 117 and the power circuit board 109, a connecting wire 115 with a plug and a socket is needed. In FIG. 2, a panel signal wire 103 and back-light signal wire 105 are connected to the LCD panel module 101 via the control circuit board 117 and the power circuit board 109, respectively.

Figure 3:
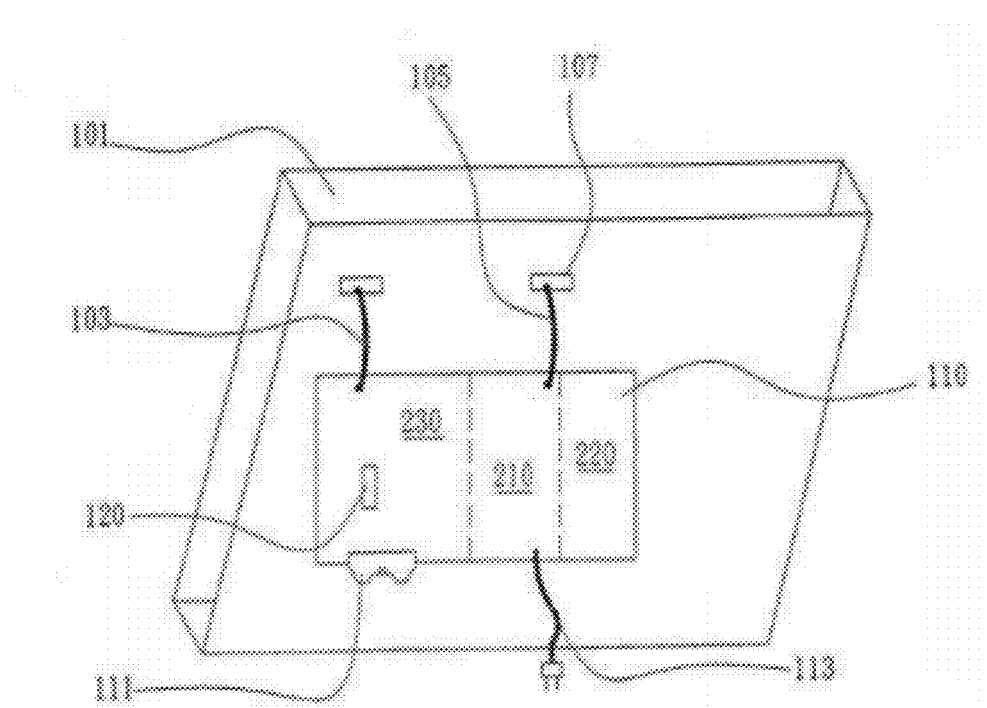
FIG. 3 is a schematic diagram showing LCD monitor circuitry according to the preferred embodiment of the present invention.

In FIG. 3, which is a schematic diagram showing LCD monitor circuitry according to the preferred embodiment of the present invention. In order for the control circuit board 117 in FIG. 2 to be installed on a single-layered PCB without increasing the cost, the pin-count of the control chip 120 is minimized so as to fit the DIP-type package. Otherwise, plastic leaded chip carrier (PLCC) package with a DIP socket can also be used. Other SMD-type passive elements such as resistors and capacitors can be mounted on the single-layered PCB because they have smaller size and lower pin-count. In the preferred embodiment of the present invention, integrated LCD monitor circuitry can be formed on a single-layered PCB, comprising a power converting circuit 210, providing power required by the LCD monitor circuitry; a back-light driving circuit 220, providing a driving signal required by a LCD back-light module; and an image processing circuit 230 for processing and controlling the image signal to display on the LCD panel. The power converting circuit, the back-light driving circuit and the image processing circuit are integrated on a single-layered printed circuit board (single-layered PCB). More particularly, the power converting circuit converts an input alternate-current (AC) voltage source into a low-voltage direct-current (DC) output. The driving signal from the back-light driving circuit 220 is high-frequency and high-voltage. The back-light driving circuit 220 provides an AC driving signal having higher frequency by frequency conversion so as to drive the LCD back-light module via the wire 105 connected to the connector 107 of the back-light module. The image processing circuit 230 comprises a micro-controller and a image controller, get the image signal from the input port 111, performing analog-to-digital conversion and magnification or reduction of an image signal. Moreover, an audio processing circuit performing magnification or reduction of an audio signal can also be integrated on the single-layered PCB.

Figure 4:
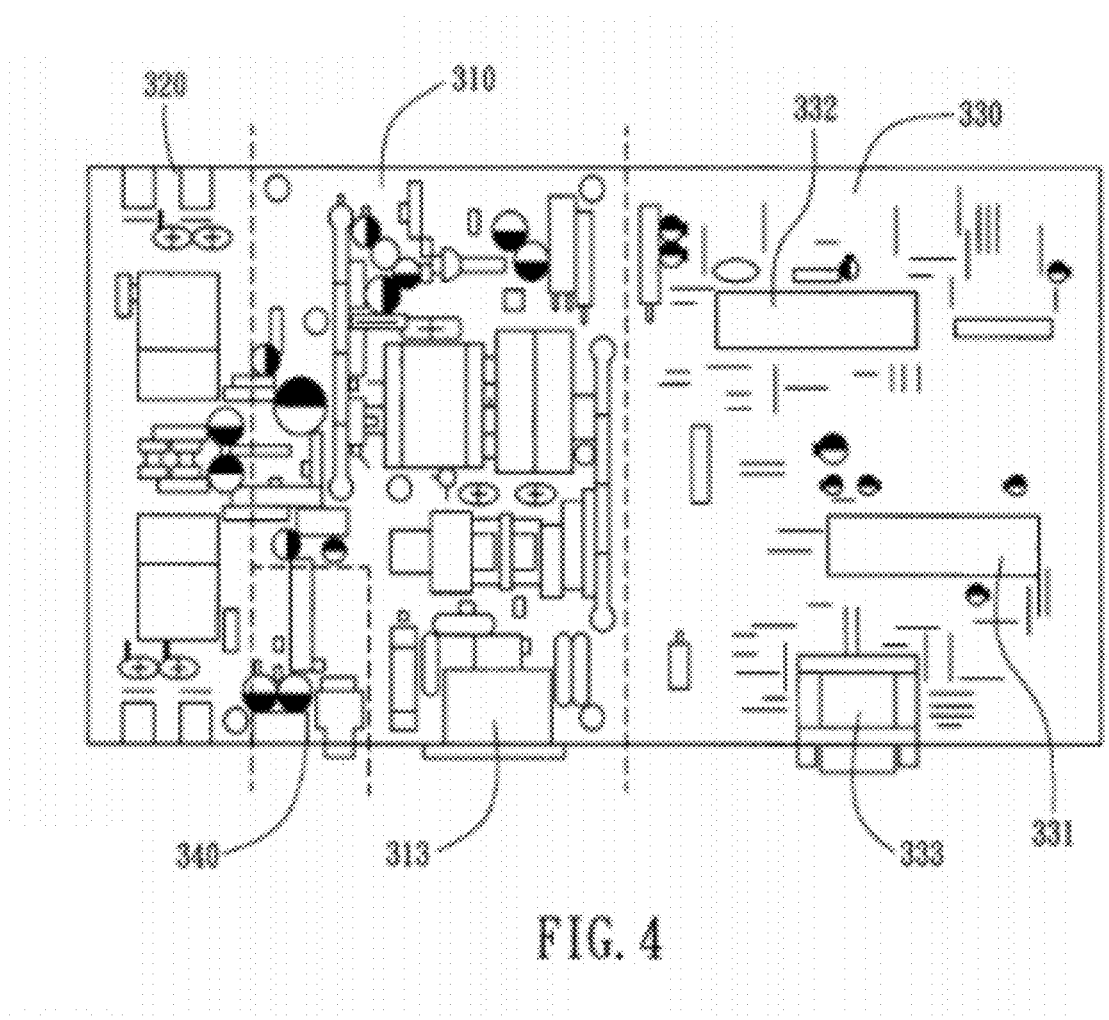
FIG. 4 is a schematic diagram showing circuit layout on a single-layered PCB according to the preferred embodiment of the present invention.

Please refer to FIG. 4, which is a schematic diagram showing circuit layout on a single-layered PCB according to the preferred embodiment of the present invention. In FIG. 4, all the elements for forming LCD circuitry are integrated on a single-layered PCB, wherein, 310 denotes a power circuit, 313 denotes a power input of the power circuit 310, 320 denotes a back-light driving circuit, 330 denotes an image processing circuit, 331 denotes an image control chip of the image control circuit, 332 denotes a micro control chip of the image control circuit, 333 denotes a signal input, and 340 denotes an audio processing circuit.

According to the above discussion, using a single-layered PCB to integrate all LCD monitor circuitry is feasible. The present invention discloses a method and a device for integrating LCD monitor circuitry using a single-layered PCB so as to increase the yield and reduce the cost. Therefore, the present invention has been examined to be novel, non-obvious and useful.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for integrating a liquid crystal display (LCD) monitor circuitry, comprising steps of:

providing a single-layered printed circuit board (PCB);

forming said LCD monitor circuitry on said single-layered PCB, wherein said LCD monitor circuitry comprises an image processor comprising a micro-controller and an image controller, and operates to receive and process incoming image signals by performing at least analog to-digital conversion and magnification/reduction of said incoming image signals;

determining whether said image processor is packaged with a dual in-line package; and installing said image processor directly on said single-layered PCB if said image processor is packaged with said dual in-line package (DIP), else installing said image processor on said single-layered PCB via a dual in-line package socket;

wherein said LCD monitor circuitry further comprises a power converting circuit, and a back-light driving circuit which are disposed on said single-layered PCB.

2. The method as claimed in claim 1, further comprising a step of:

disposing said single-layered PCB on a panel module of a LCD monitor.

* * * * *